Oct. 11, 1966 H. E. FROEHLICH ETAL 3,277,747
GEAR DRIVE ACTUATING MECHANISM

Filed Oct. 9, 1963 3 Sheets-Sheet 1

INVENTORS
HAROLD E. FROEHLICH
FORREST R. GRIMM
BY Robert B. Hughes

ATTORNEY

INVENTORS
HAROLD E. FROEHLICH
FORREST R. GRIMM
BY Robert B. Hughes

ATTORNEY

Oct. 11, 1966

H. E. FROEHLICH ETAL 3,277,747

GEAR DRIVE ACTUATING MECHANISM

Filed Oct. 9, 1963

INVENTORS
HAROLD E. FROEHLICH
FORREST R. GRIMM

BY Robert B. Hughes

ATTORNEY

United States Patent Office 3,277,747
Patented Oct. 11, 1966

3,277,747
GEAR DRIVE ACTUATING MECHANISM
Harold E. Froehlich and Forrest R. Grimm, Minneapolis, Minn., assignors to General Mills, Inc., a corporation of Delaware
Filed Oct. 9, 1963, Ser. No. 314,920
8 Claims. (Cl. 74—801)

The invention described herein was made in the performance of work under a NASA contract and is subject to the provisions of the National Aeronautics and Space Act of 1958, Public Law 85–568 (72 Stat. 426; 42 U.S.C. 2451) as amended.

This invention relates to an actuating mechanism, and more particularly to a gear reduction boom actuator for use in a hostile environment such as that encountered on the moon's surface.

The present invention was designed as part of a lunar television camera manipulating assembly to serve the particular function of moving a camera boom from a base member about an axis of rotation. Because of the environmental conditions on the moon, this actuator must be able to operate in a vacuum and within a broad temperature range (from perhaps as low as minus two hundred degrees to plus four hundred degrees Fahrenheit). It should be able to operate free of maintenance, and for practical reasons relating in part to the difficulties involved in delivering a pay load on the moon, the actuator should be rugged and very light and compact in relation to its torque output.

Hence, it is an object of the present invention to provide a compact, light-weight and efficient high-torque motor and gear unit especially adapted for use in the environmental conditions indicated above.

Figure 1:
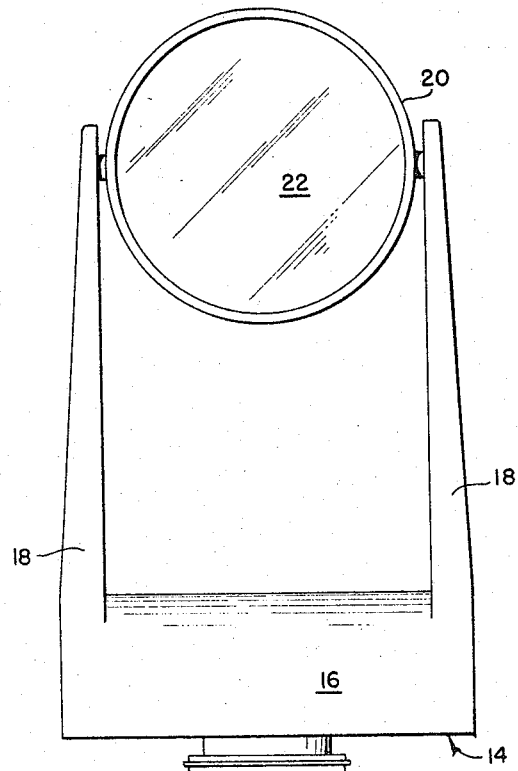
FIGURE 1 is a side elevational view of a lunar television camera manipulating assembly for which the actuator of the present invention is particularly adapted.
Figure 1:
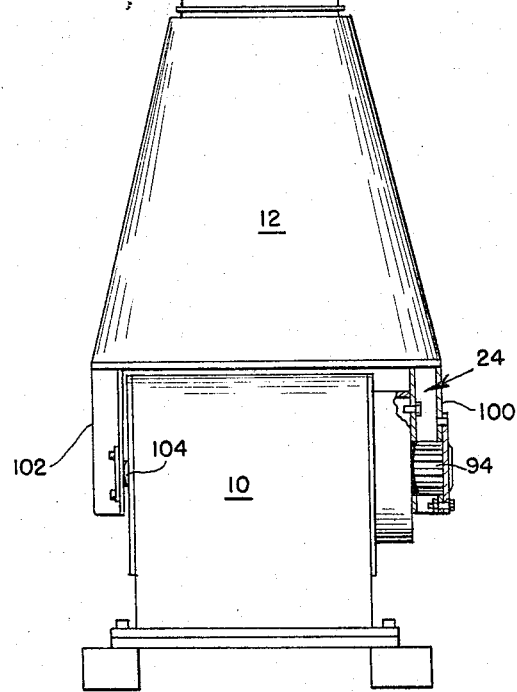
Figure 2:
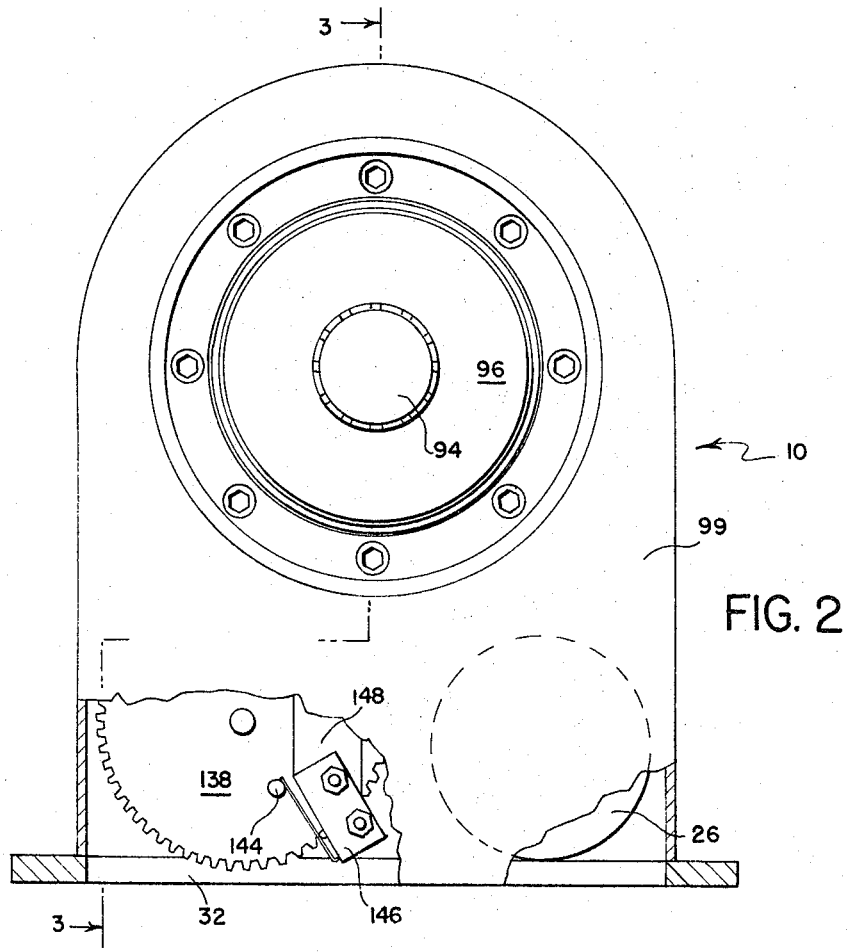
FIGURE 2 is a front elevational view of the base portion of the camera manipulating assembly, in which base portion the actuator of the present invention is housed.
Figure 4:
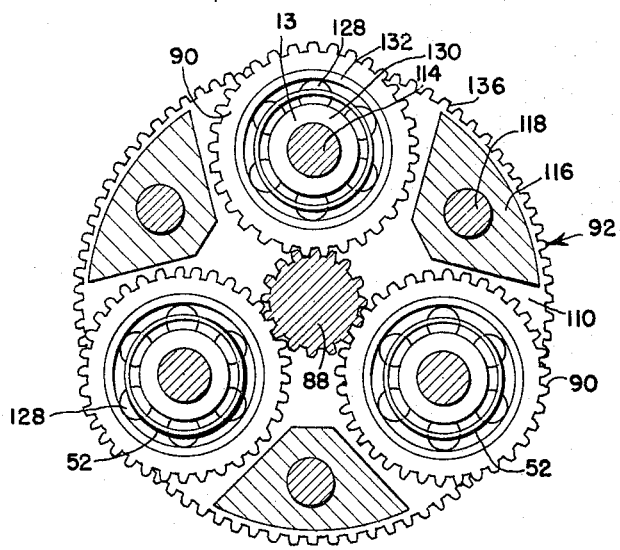
FIGURE 4 is a transverse sectional view taken on line 4—4 of FIGURE 3.
Figure 3:
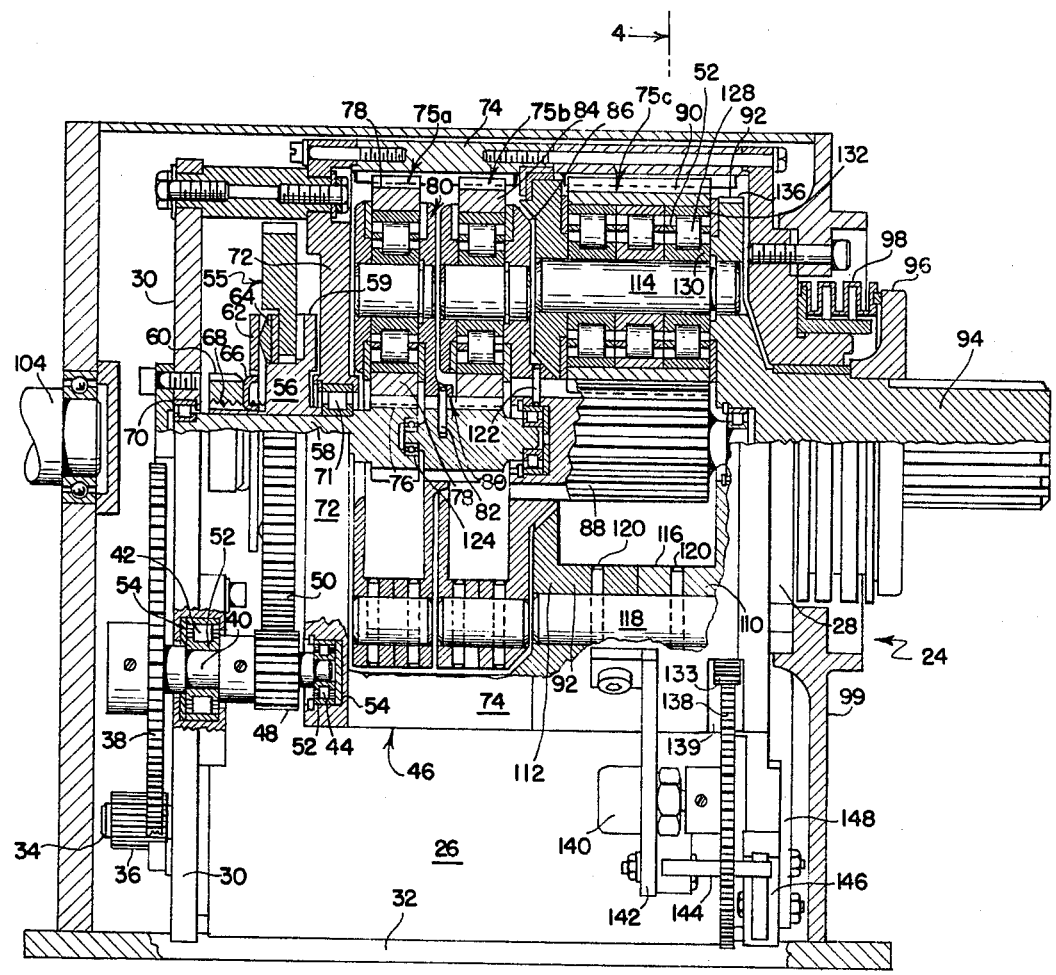
FIGURE 3 is a longitudinal sectional view taken generally on line 3—3 of FIGURE 2.

Referring to the accompanying drawings, it can be seen that the lunar TV camera manipulating assembly comprises a base member 10, above which a boom 12 is mounted for swing motion about a horizontal axis. At the upper or outer end of the boom 12 a mounting yoke 14 is journal mounted by the shoulder portion 16 thereof for rotary motion about an axis coincident with the longitudinal axis of the boom 12. This yoke 14 has a pair of upstanding arms 18 between which a camera mounting ring 20 is mounted for rotary movement about an axis perpendicular to the rotary axis of the yoke 14. Thus by turning the ring 20 and/or the yoke 14 through suitable power and control means, the camera 22 mounted in the ring 20 can be made to face in any direction, and by swinging the boom 12 with respect to the base 10 the camera 22 can be swung in an arc of about 180° about the swing axis of the boom 12 so as to change both the elevation and lateral position of the camera 22.

The actuator of the present invention, generally designated 24, is housed in the base 10 and functions to move and properly locate the boom 12 about its axis of rotation. This unit 24 comprises an electric motor 26 positioned at the lower right hand side of the base 10 and supported by front and rear transversely disposed mounting plates 28 and 30, respectively, which are upstanding from a base plate 32 of the base member 10. The drive shaft 34 of the motor 26 extends rearwardly through the rear mounting plate 30 and has pinned thereto a pinion gear 36 which meshes with a spur gear 38 located thereabove, which spur gear 38 is in turn fixed to a shaft 40 extending forwardly from the gear 38 to be journaled at 42 and 44 in, respectively, the rear plate 30 and a planetary gear housing 46 to be described more fully hereinafter. Fixed to this shaft 40 between the gear mounting plate 30 and the planetary gear housing 46 is a second pinion gear 48 which meshes with a second spur gear 50 located thereabove.

It should be noted that the separators 52 for the bearings at 42 and 44 and also for the other roller bearings herein are made of "Teflon" so as to eliminate the need for any liquid lubricating medium (which, of course, would be impractical under the aforedescribed lunar environmental conditions). The thrust bearings 54 for the bearing units at 42 and 44 are made of a "Glacier DU" dry bearing material, which material is described in a booklet entitled "Designer's Handbook No. 2." (Second Edition) published by the Glacier Metal Company, Ltd., having offices at Alperton, Wembley, and Middlesex, England. This "DU" material comprises a backing strip of steel, a middle layer of porous tin bronze filled solidly with a fluorocarbon plastic and fine lead powder, and an overlay about one-thousanth inch thick of the same fluorocarbon plastic and lead mixture. This "DU" material has various desirable qualities which lend itself to this use, among which are: withstanding high temperature, needing no lubrication to present a proper bearing surface, wears well, has no "stick slip" effect, etc.

The aforementioned second spur gear 50 forms the drive portion of a clutch assembly, generally designated 55, through which the pinion and spur gear train 36–38 and 48–50 drives a planetary gear train to be described hereinafter. This spur gear has a through center opening to permit it to be concentrically mounted on a driven clutch member 56 which in turn is fixed, as by a pin, to an initial drive shaft 58 of the planetary gear assembly. This driven clutch member 56 is formed with a radially extending flange 59, the rear surface of which forms a clutch face to engage the inner portion of the front surface of the spur gear 50.

A nut 60 is threaded on the rear of the clutch member 56 and bears against a spring washer 62 to press a ring member 64 against the inner portion of the rear face of the spur gear 50, with this ring member 64 thus forming a second driven clutch face. By loosening or tightening the nut 60 so as to change the pressure exerted by the clutch flange 59 and the clutch ring 64, it is possible to control the torque load under which the spur gear 50 will slip with respect to the planetary drive which is to be described hereinafter.

The spring washer 62 has a plurality of arms 66 which are keyed as at 68, to the second clutch member 56. Thus the clutch ring 64 frictionally engages the washer 62 which in turn is positively connected (by the washer arms 66) to the second clutch member 56 so that the ring 64 as well as the flange 59 transmits torque from the spur gear 50 to the sun gear drive shaft 58.

It should be noted that the engaging surfaces of the clutch flange 59 and its ring 64 are faced with the aforedescribed "DU" material. It is characteristic of this "DU" material that the static coefficient of friction thereof is somewhat lower than the static sliding friction. This prevents a sudden overload from causing the clutch to "break free" under an impact load and then keep slipping because of a condition of the sliding coefficient of friction being lower than the static coefficient of friction.

The sun gear drive shaft 58 is journal mounted at its extreme rear end at 70 to the rear mounting plate 28, and is also journal mounted near its front end at 71 to the rear wall 72 of the aforementioned planetary gear housing 46. This planetary gear housing 46 comprises the rear wall 72, a cylindrical side wall 74 fixed thereto and the upper portion of the aforementioned mounting wall 28. For convenience of manufacture and assembly the side wall 74 is made as two pieces.

The planetary drive contained in the housing 46 comprises three units or stages, designated 75a, b and c, respectively, with the sun gear 76 of the first stage being driven from the clutch 55 by the aforementioned drive shaft 58, with which the sun gear 76 is formed integrally at the front end thereof. This planetary assembly is located above the motor 26 and has the longitudinal axis thereof parallel to that of the motor and coincident with that of the clutch 55. This sun gear 76 meshes with three planetry gears 78 which in turn mesh with gear teeth formed in the interior surface of the housing side wall 74, which thus serves as a ring gear for this first planetary unit 75a, as it does for the other two planetary units 75b and c. The carrier 80 for the planet gears 78 is fixed to a second sun gear 82 of the second planetary unit 77b aligned with and located forward of the first planetary unit 76–80, and being similar thereto. Accordingly, this second planetary unit 75b has three planet gears 84 mounted in a carrier 86, which carrier 86 is in turn fixed to a third sun gear 88 of a third planetary unit 75c.

Due to the increased torque exerted on this third planetary unit 75c, the planet gears 90 and the sun gear 88 thereof have increased axial length to increase the bearing surface of their associated gear teeth. The carrier 92 of the third planetary unit is fixed to a splined output shaft 94 which extends through the front wall 28 which, as before indicated, serves as the front wall of the planetary housing 46. Mounted on this splined shaft is a flange seal 96 connected to a bellows like seal member 98 which in turn is connected to the housing 99 of the base member 10 to seal the interior thereof from the surrounding environment.

The aforementioned swing mounted boom 12 is formed with downwardly extending front and rear arms 100 and 102, by which it is mounted to the base 10. The front arm 100 is splined to the planetary output shaft 94 while the rear arm 102 is journaled as at 104 to the base member 10 at the rear end thereof. Thus it can be seen that the motor 26 turns the pinion and spur gear train 36–38 and 48–50 which through the clutch mechanism 55 turns the input sun gear shaft 58 which in turn through the three planetary units 75a-c turns the spline shaft 94 and thus causes the boom 12 to travel in an arcuate path.

Each of the three planet carriers 80, 86 and 92 are of similar construction, and consequently the following description of the carrier 92 is intended to refer generally to the other two carriers 80 and 86. This carrier 92 comprises a front and rear plate 110 and 112 engaging, respectively, the front and rear faces of the planet gears 90. Reaching between and fixed to each of the plates 110 and 112 are three shafts 114, on each of which is mounted a respective one of the planet gears 90. The plates 110 and 112 each have at locations between each pair of shafts 114 a protruding joining piece 116 which bears against a related joining piece 116 from the other plate 112 or 110. A dowel 118 reaches through each pair of joining pieces 116 and is held to each piece 116 by a respective one of a pair of pins 120. The front plate 110 of each of the carriers 80 and 86 has a center through opening to receive the rear end of the sun gears 82 and 88 respectively, to which each is joined by means of a pin 122. As before indicated, the front wall 110 of the third planetary unit 75c is fixed to the spline shaft 94. Radial bearing support is provided as at 124, between the first and second sun gears 76 and 82, as it is between sun gears 82 and 88.

The planet gears 78, 84 and 90 are each mounted to its respective shaft 116 through suitable roller bearings 128 having inner and outer races 130 and 132, respectively. The faces of the carrier plates 110 and 112 which engage the planet gears 78 are desirably formed with the aforementioned "DU" material.

The front plate 110 of the carrier 92 of the third planetary unit has gear teeth 136 formed about the periphery thereof, which teeth 136 engage a spur gear 138 through an opening 139 in the lower front end of the planetary housing 46. This spur gear 138 is connected to a potentiometer 140 mounted by an arm 142 to the planetary housing 48. Thus rotation of the spline shaft 94 which in turn changes the position of the boom 12, will cause a corresponding rotation of the spur gear 138. With the spur gear 138 being operatively connected to the potentiometer 140, this potentiometer 140 is able to indicate the position of the boom 12.

Fixed to this spur gear 138 is a limit pin 144 which is arranged to engage a pair of limit switches, one of which is shown at 146 mounted from a bracket 148. Thus when the boom 12 has rotated downwardly to a predetermined extent, the pin 144 engages either the switch 146 or the other limit switch (not shown) and thus cuts off current to the motor 26 to prevent further swing movement of the boom 12.

In operation, the motor 26 turns the pinion gear 36 which meshes with the spur gear 38, which gear 38 through the shaft 40 turns the pinion 48 which meshes with the spur gear 50. This spur gear 50 acts through the clutch assembly 55 (of which the gear 50 is a part) to turn the input shaft 58 of the planetary assembly comprising the three planetary units 75a, b and c. These planetary units 75a, b and c function as a speed reducing planetary gear train connected to the splined output shaft 94 to which the boom 12 is connected. The planet carrier 92 has the front plate 110 thereof formed with peripheral gear teeth to mesh with the gear 138 connected to the potentiometer 140, so that the potentiometer senses the position of the boom 12. If there is any overload, either external or internal, exerted on the apparatus the spur gear clutch member 50 will slip with respect to clutch members 59 and 64. Since the clutch face material (i.e. the aforedescribed "DU" material) has a sliding coefficient of friction greater than its static coefficient of friction, if there is a momentary overload, the clutch assembly 55 will slip to a moderate extent and then take hold again. Adjustment of the torque load under which the clutch will slip is achieved through either tightening or loosening the nut 60.

It should be understood that the foregoing is merely illustrative of a certain embodiment of the invention and many variations may be made by those skilled in the art without departing from the spirit and scope of the invention.

Now therefore, we claim:

1. An actuator to cause swing motion of a member with respect to a base member, said actuator comprising:
    (a) a housing,
    (b) a motor mounted in said housing,
    (c) a speed reducing pinion and spur gear train operatively connected to said motor,
    (d) an overload clutch having an input and an output portion and operatively connected by its input portion to said pinion and gear train,
    (e) a speed reducing planetary gear assembly operatively connected by an input end to the output portion of said clutch, and
    (f) an output shaft operatively connected to an output end of said planetary assembly,
the input portion of said overload clutch being fixed to an output spur gear of said pinion and spur gear train, and the output portion of said clutch being fixed to an input shaft means of said planetary assembly, said output spur gear being concentrically mounted with respect to said planetary input shaft means and presenting a front and a rear clutch face, said input shaft means having a clutch flange engaging one of said clutch faces of said output spur gear, a second output clutch member engaging the other clutch face of said output spur gear, means mounted from said planetary input shaft means to press said second output clutch member against said other clutch face and to thus press said one of said clutch faces against said clutch flange.

2. The actuator as recited in claim 1, wherein said second output clutch member comprises a ring member pressed by a spring washer against said output spur gear, and there is a nut member threadedly mounted to said input shaft member to press said spring washer against said ring, said spring washer being keyed to said input shaft means and frictionally engaging said ring so that torque is transmitted from said output spur gear through said ring to said input shaft means.

3. An actuator to cause swing motion of a member with respect to a base member, said actuator comprising:
(a) a housing,
(b) a motor mounted in said housing,
(c) a speed reducing pinion and spur gear train operatively connected to said motor,
(d) an overload clutch having an input and an output portion and operatively connected by its input portion to said pinion and gear train, said overload clutch having engaging face means comprising a material which is characterized by having a lower coefficient of static friction than its coefficient of sliding friction,
(e) a speed reducing planetary gear assembly operatively connected by an input end to the output portion of said clutch, and
(f) an output shaft operatively connected to an output end of said planetary assembly.

4. The actuator as recited in claim 3 wherein said clutch material has at least one face thereof comprising a porous bronze material filled solidly with a mixture of powdered lead and a fluorocarbon plastic to provide the frictional characteristics recited in claim 3.

5. An actuator to cause swing motion of a member with respect to a base member, said actuator comprising:
(a) a housing,
(b) a motor mounted in said housing,
(c) a speed reducing pinion and spur gear train operatively connected to said motor,
(d) an overload clutch having an input and an output portion and operatively connected by its input portion to said pinion and gear train,
(e) a speed reducing planetary gear assembly operatively connected by an input end to the output portion of said clutch, and
(f) an output shaft operatively connected to an output end of said planetary assembly, said planetary gear assembly comprising a cylindrical housing and a plurality of planetary units contained therein, each of which planetary units comprises: a sun gear, a plurality of planet gears meshing therewith, each of which planet gears meshing with gear teeth formed in the interior of said cylindrical housing, and a planet gear carrier which planet gear carrier is fixedly secured to a sun gear of a succeeding planetary unit, with a carrier of a final planetary unit being operatively connected to the output shaft of said actuator.

6. The actuator as recited in claim 5 wherein each carrier comprises front and rear plates secured to one another and providing a plurality of planet shafts extending therebetween, each of said planet shafts carrying a respective planet gear thereon.

7. The actuator as recited in claim 5 wherein the planet carrier of the final unit of said planetary assembly is operatively connected to gear means which meshes with second gear means operatively connected to a potentiometer.

8. The actuator as recited in claim 7 wherein said second gear means has limit pin means to engage limit switch means at predetermined locations to limit the motion of said swing mounted member.

References Cited by the Examiner

UNITED STATES PATENTS

| | | | |
|---|---|---|---|
| 1,642,452 | 9/1927 | Lovett | 74—750 X |
| 1,750,827 | 3/1930 | Wemp | 192—55 |
| 2,480,212 | 8/1949 | Baines | 192—02 |
| 2,591,967 | 4/1952 | Ridgely | 74—801 |
| 3,108,498 | 10/1963 | James et al. | 74—80 X |

DAVID J. WILLIAMOWSKY, Primary Examiner.

J. R. BENEFIEL, Assistant Examiner.